(12) United States Patent
Nishida et al.

(10) Patent No.: US 9,282,534 B2
(45) Date of Patent: Mar. 8, 2016

(54) MOBILE COMMUNICATION METHOD, SESSION CONTROL NODE, GATEWAY DEVICE, AND MOBILITY MANAGEMENT NODE

(75) Inventors: Katsutoshi Nishida, Tokyo (JP); Shimpei Kawakatsu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 48 days.

(21) Appl. No.: 13/508,629

(22) PCT Filed: Nov. 9, 2010

(86) PCT No.: PCT/JP2010/069914
§ 371 (c)(1),
(2), (4) Date: Jun. 29, 2012

(87) PCT Pub. No.: WO2011/055840
PCT Pub. Date: May 12, 2011

(65) Prior Publication Data
US 2012/0270574 A1    Oct. 25, 2012

(30) Foreign Application Priority Data
Nov. 9, 2009  (JP) ................................. 2009-256585

(51) Int. Cl.
*H04W 68/00* (2009.01)
*H04W 68/02* (2009.01)
(Continued)

(52) U.S. Cl.
CPC ............. *H04W 68/02* (2013.01); *H04L 65/103* (2013.01); *H04L 65/104* (2013.01); *H04L 65/1016* (2013.01); *H04L 65/1046* (2013.01); *H04L 65/1069* (2013.01); *H04W 76/02* (2013.01); *H04W 80/10* (2013.01)

(58) Field of Classification Search
CPC .... H04W 68/00; H04W 68/005; H04W 68/02
USPC ......................................................... 455/458
See application file for complete search history.

(56) References Cited

U.S. PATENT DOCUMENTS

| 8,428,625 B2 * | 4/2013 | Ramankutty et al. ......... 455/458 |
| 2010/0039978 A1 * | 2/2010 | Rangan ......................... 370/312 |
| 2010/0220680 A1 | 9/2010 | Ramankutty et al. |

FOREIGN PATENT DOCUMENTS

| CN | 101394667 A | 3/2009 |
| JP | 6-509456 A | 10/1994 |

(Continued)

OTHER PUBLICATIONS

Office Action for Japanese Patent Application No. 2009-256585 mailed Feb. 1, 2011, with English translation thereof (5 pages).

(Continued)

*Primary Examiner* — Omoniyi Obayanju
(74) *Attorney, Agent, or Firm* — Osha Liang LLP

(57) ABSTRACT

A mobile communication method according to the present invention includes a step of establishing, by a session control node S/P-CSCF, a prioritized-call bearer between a gateway device P-GW and a mobile station UE when an Invite signal including prioritized-call information is received; a step of transmitting, by the session control node S/P-CSCF, the Invite signal including the prioritized-call information to the gateway device P-GW after the prioritized-call bearer is established; and a step of transmitting, by the gateway device P-GW, the Invite signal including the prioritized-call information to the mobile station UE.

2 Claims, 12 Drawing Sheets

(51) Int. Cl.
*H04L 29/06* (2006.01)
*H04W 76/02* (2009.01)
*H04W 80/10* (2009.01)

(56) References Cited

FOREIGN PATENT DOCUMENTS

JP    2009-153141 A    7/2009
WO    93/17531 A1    9/1993

OTHER PUBLICATIONS

International Search Report w/translation from PCT/JP2010/069914 dated Feb. 8, 2011 (4 pages).
3GPP TS 23.401 V9.2.0; "3rd Generation Partnership Project; Technical Specification Group Services and System Aspects; General Packet Radio Service (GPRS) enhancements for Evolved Universal Terrestrial Radio Access Network (E-UTRAN) access (Release 9)"; Sep. 2009; pp. 28-31, 110-112 (8 pages).
3GPP TSG-RAN WG2 #67, R2-094627; "Emergency Terminating Call Functionality"; Nec et al.; Shenzhen, China; Aug. 24-28, 2009 (2 pages).
3GPP TS 23.272 V11.0.0; "3rd Generation Partnership Project; Technical Specification Group Services and System Aspects; Circuit Switched (CS) fallback in Evolved Packet System (EPS); Stage 2 (Release 11)"; Mar. 2012 (87 pages).
3GPP TS 23.228 V11.4.0; "3rd Generation Partnership Project; Technical Specification Group Services and System Aspects; IP Multimedia Subsystem (IMS); Stage 2 (Release 11)"; Mar. 2012 (287 pages).
Office Action in counterpart Chinese Patent Application No. 201080050760.3, mailed May 6, 2014 (18 pages).
Office Action issued Oct. 31, 2014 in corresponding Chinese Application No. 201080050760.3 (14 pages) (with translation).

\* cited by examiner

MOBILE COMMUNICATION METHOD, SESSION CONTROL NODE, GATEWAY DEVICE, AND MOBILITY MANAGEMENT NODE

TECHNICAL FIELD

The present invention relates to a mobile communication method, a session control node, a gateway device, and a mobility management node.

BACKGROUND ART

Non-patent document 1 has disclosed a mobile communication system using IMS (IP Multimedia Subsystem), and Non-patent document 2 has disclosed an incoming voice call control method using "CS Fallback".

PRIOR ART DOCUMENT

Non-Patent Document

Non-patent document 1: 3GPP TS 23.228
Non-patent document 2: 3GPP TS 23.272

However, there is a problem in the above-mentioned mobile communication systems in that even when there arrives a call that should be prioritized such as an important communication (hereinafter, referred to as a prioritized call) destined to a mobile station UE that is in an idle state, if a mobility management node MME (Mobility Management Entity) or a radio base station eNodeB is congested, it is not possible to preferentially process the arrival of the prioritized call over the arrival of a normal call.

The above problem will be described with reference to FIG. 8 to FIG. 13.

Firstly, as illustrated in FIG. 8, if an Invite signal including prioritized-call information indicating the arrival of a prioritized call is received in step S1001, a session control node S/P-CSCF (Call Session Control Function) transfers the Invite signal to a gateway device P-GW (PDN-Gateway) in step S1002.

In step S1003, the gateway device P-GW transmits user data such as GTP-U (GPRS Tunneling Protocol-U plane) data including the Invite signal, to a gateway device S-GW (Serving-Gateway).

If the above-mentioned GTP-U data is received, the gateway device S-GW transmits "Downlink Data Notification" to a mobility management node MME in step S1004.

Here, it is not possible for the mobility management node MME to determine whether the received "Downlink Data Notification" corresponds to a signal related to a prioritized call or corresponds to a signal related to a normal call.

Therefore, as illustrated in step S1005, it is not possible for the mobility management node MME in a congestion state to preferentially perform a transmission process of "Paging" for the "Downlink Data Notification" related to the prioritized call over a transmission process of "Paging" for the "Downlink Data Notification" related to the normal call as described above, resulting in a problem that the "Downlink Data Notification" related to the prioritized call is discarded.

Secondly, as illustrated in FIG. 9, operations of step S2001 to step S2004 are identical to the operations of step S1001 to step S1004 illustrated in FIG. 8.

If the above-mentioned "Downlink Data Notification" is received, the mobility management node MME transmits "Paging" to a radio base station eNodeB in step S2005.

Here, it is not possible for the radio base station eNodeB to determine whether the received "Paging" corresponds to a signal related to a prioritized call or corresponds to a signal related to a normal call.

Therefore, as illustrated in step S2006, it is not possible for the radio base station eNodeB in a congestion state to preferentially perform a transmission process of the "Paging" related to the prioritized call over a transmission process of "the Paging" related to the normal call as described above, resulting in a problem that the "Paging" related to the prioritized call is discarded.

Thirdly, as illustrated in FIG. 10, operations of step S3001 to step S3005 are identical to the operations of step S2001 to step S2005 illustrated in FIG. 9.

If the "Paging" is received from the mobility management node MME, the radio base station eNodeB transmits the "Paging" to a mobile station UE camping on a subordinate cell in step S3006.

In step S3007, the mobile station UE transmits "RRC Connection Request" to the radio base station eNodeB in response to the "Paging" received from the radio base station eNodeB.

Here, it is not possible for the radio base station eNodeB to determine whether the received "RRC Connection Request" corresponds to a signal related to a prioritized call or corresponds to a signal related to a normal call.

Therefore, as illustrated in step S3008, it is not possible for the radio base station eNodeB in a congestion state to preferentially perform a process for the "RRC Connection Request" related to the prioritized call over a process for the "RRC Connection Request" related to the normal call as described above, resulting in a problem that the "RRC Connection Request" related to the prioritized call is discarded.

Fourthly, as illustrated in FIG. 11, if an incoming voice call including prioritized-call information indicating the arrival of a prioritized call is received in step S4001, a mobile switching center MSC (Mobile-service Switching Center) transmits "Paging Request" including the prioritized-call information to the mobility management node MME in step S4002.

Here, it is not possible for the mobility management node MME to perform priority control for a transmission process of "Paging" based on the prioritized-call information. Therefore, as illustrated in step S4003, it is not possible for the mobility management node MME in a congestion state to preferentially perform a transmission process of the "Paging" related to the prioritized call over a transmission process of the "Paging" related to the normal call as described above, resulting in a problem that the "Paging Request" including the prioritized-call information is discarded.

Fifthly, as illustrated in FIG. 12, operations of step S5001 and step S5002 are identical to the operations of step S4001 and step S4002 illustrated in FIG. 11.

If the "Paging Request" is received, the mobility management node MME transmits "Paging" to the radio base station eNodeB, in step S5003.

Here, it is not possible for the radio base station eNodeB to determine whether the received "Paging" corresponds to a signal related to a prioritized call or corresponds to a signal related to a normal call.

Therefore, as illustrated in step S5004, it is not possible for the radio base station eNodeB in a congestion state to preferentially perform a transmission process of the "Paging" related to the prioritized call over a transmission process of the "Paging" related to the normal call as described above, resulting in a problem that the "Paging" related to the prioritized call is discarded.

Sixthly, as illustrated in FIG. 13, operations of step S6001 to step S6003 are identical to the operations of step S5001 to step S5003 illustrated in FIG. 12.

If the "Paging" is received from the mobility management node MME, the radio base station eNodeB transmits the "Paging" to a mobile station UE camping on a subordinate cell in step S6004.

In step S6005, the mobile station UE transmits "RRC Connection Request" to the radio base station eNodeB in response to the "Paging" received from the radio base station eNodeB.

Here, it is not possible for the radio base station eNodeB to determine whether the received "RRC Connection Request" corresponds to a signal related to a prioritized call or corresponds to a signal related to a normal call.

Therefore, as illustrated in step S6006, it is not possible for the radio base station eNodeB in a congestion state to preferentially perform a process for the "RRC Connection Request" related to the prioritized call over a process for the "RRC Connection Request" related to the normal call as described above, resulting in a problem that the "RRC Connection Request" related to the prioritized call is discarded.

SUMMARY OF THE INVENTION

Therefore, the present invention has been achieved in view of the above-described problems, and an object thereof is to provide a mobile communication method, a session control node, a gateway device, and a mobility management node, by which it is possible to preferentially process the arrival of a prioritized call to a mobile station UE in an idle state over the arrival of a normal call even when a mobility management node MME or a radio base station eNodeB is congested.

A first characteristic of the present invention is summarized as a mobile communication method that includes: a step of establishing, by a session control node, a prioritized-call bearer between a gateway device and a mobile station when a session start signal including prioritized-call information is received; a step of transmitting, by the session control node, the session start signal to the gateway device after the prioritized-call bearer is established; and a step of transmitting, by the gateway device, the session start signal to the mobile station.

A second characteristic of the present invention is summarized as a mobile communication method that includes: a step of transferring, by a session control node, a session start signal to a first gateway device when the session start signal including prioritized-call information is received; a step of transmitting, by the first gateway device, user data including the session start signal to a second gateway device; a step of transmitting, by the second gateway device, when the prioritized-call information is included in the session start signal included in the received user data, a notification signal including a priority identifier indicating the inclusion, to a mobility management node; a step of transmitting, by the mobility management node, a paging signal including the priority identifier to a radio base station; a step of transmitting, by the radio base station, the paging signal including the priority identifier to a mobile station; and a step of transmitting, by the mobile station, a connection setup request signal including the priority identifier to the radio base station in response to the paging signal received from the radio base station.

A third characteristic of the present invention is summarized as a mobile communication method that includes: a step of transferring, by a session control node, by a session start signal to a first gateway device when the session start signal including prioritized-call information is received; a step of transmitting, by the first gateway device, when the prioritized-call information is included in the received session start signal, user data including a priority identifier indicating the inclusion and the session start signal, to a second gateway device; a step of transmitting, by the second gateway device, a notification signal including the priority identifier to a mobility management node; a step of transmitting, by the mobility management node, a paging signal including the priority identifier to a radio base station; a step of transmitting, by the radio base station, the paging signal including the priority identifier to a mobile station; and a step of transmitting, by the mobile station, a connection setup request signal including the priority identifier to the radio base station in response to the paging signal received from the radio base station.

A fourth characteristic of the present invention is summarized as a mobile communication method that includes: a step of transmitting, by a core network device of a first communication scheme, a paging request signal including prioritized-call information to a core network device of a second communication scheme when an incoming call signal including the prioritized-call information is received; a step of transmitting, by the core network device of the second communication scheme, when the prioritized-call information is included in the received paging request signal, a paging signal including a priority identifier indicating the inclusion, to a radio base station; a step of transmitting, by the radio base station, the paging signal including the priority identifier to a mobile station; and a step of transmitting, by the mobile station, a connection setup request signal including the priority identifier to the radio base station in response to the paging signal received from the radio base station.

A fifth characteristic of the present invention is summarized in that a session control node is configured to instruct a policy and charging control node to establish a prioritized-call bearer between a gateway device and a mobile station when a session start signal including prioritized-call information is received, and to transmit the session start signal to the gateway device after the prioritized-call bearer is established.

A sixth characteristic of the present invention is summarized in that a gateway device connected to a first gateway device and a mobility management node is configured to transmit, when prioritized-call information is included in a session start signal included in user data received from the first gateway device, a notification signal including a priority identifier indicating the inclusion, to the mobility management node.

A seventh characteristic of the present invention is summarized in that a gateway device connected to a session control node and a second gateway device is configured to transmit, when prioritized-call information is included in the session start signal received from the session control node, user data including a priority identifier indicating the inclusion and a session start signal, to the second gateway device.

An eighth characteristic of the present invention is summarized in that a mobility management node is configured to preferentially transmit, when prioritized-call information is included in a paging request signal received from a core network device of another communication scheme, a paging signal including a priority identifier indicating the inclusion, to a subordinate radio base station over a paging signal including no priority identifier.

As described above, according to the present invention, it is possible to provide a mobile communication method, a session control node, a gateway device, and a mobility management node, by which it is possible to preferentially process the arrival of a prioritized call to a mobile station UE in an idle state over the arrival of a normal call even when a mobility management node MME or a radio base station eNodeB is congested.

DETAILED DESCRIPTION

Mobile Communication System According to First Embodiment of the Present Invention With reference to FIG. 1 and FIG. 2, a mobile communication system according to a first embodiment of the present invention will be described. The mobile communication system according to the present embodiment is a mobile communication system of an E-UTRAN scheme.

In addition, the present invention is also applicable to radio of a UTRAN-GERAN scheme. In such a case, a gateway device P-GW corresponds to a mobile switching center GGSN, a gateway device S-GW and a mobility management node MME correspond to a mobile switching center SGSN, and a radio base station eNodeB corresponds to a radio line control station RNC.

Figure 1:
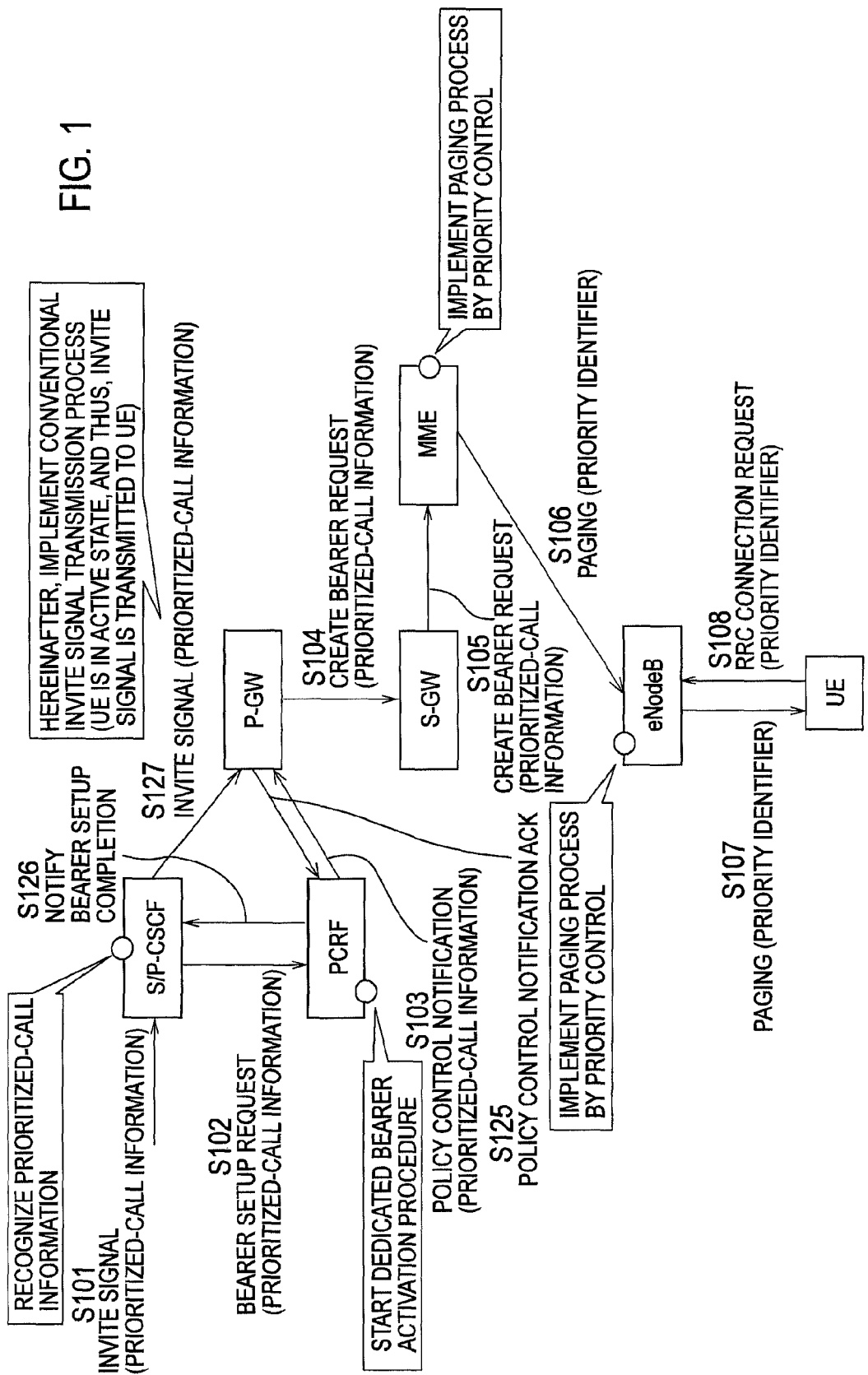
FIG. 1 is a diagram explaining the operation of a mobile communication system according to a first embodiment of the present invention.

As illustrated in FIG. 1, the mobile communication system according to the present embodiment is provided with a radio base station eNodeB, a mobility management node MME, a gateway device S-GW, a gateway device P-GW, a policy and charging control node PCRF (Policy and Charging Rules Function), a session control node S/P-CSCF and the like.

Hereinafter, with reference to FIG. 1 and FIG. 2, the operation of the mobile communication system according to the present embodiment will be described.

Figure 2:
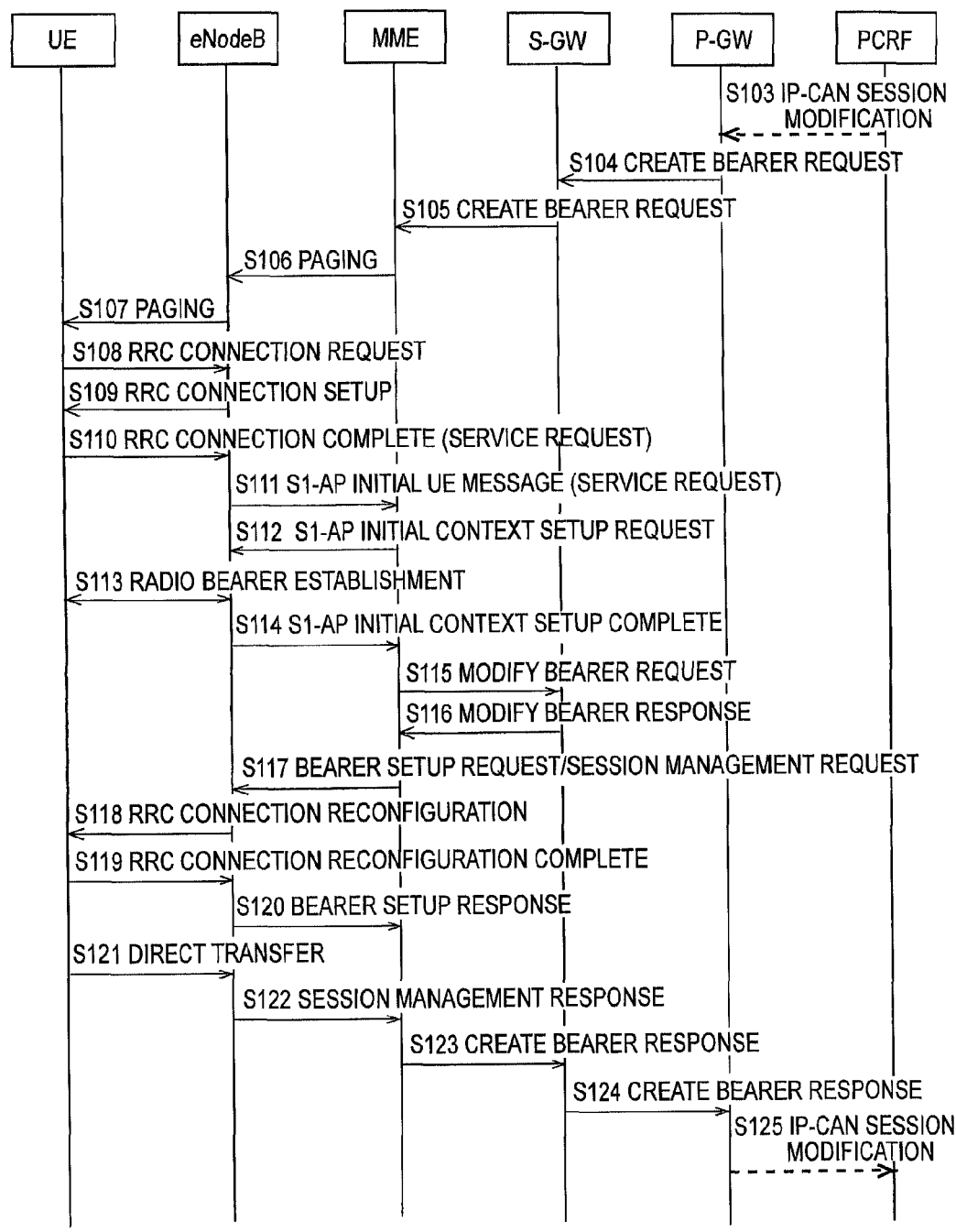
FIG. 2 is a sequence diagram illustrating the operation of a Dedicated Bearer Activation procedure in the mobile communication system according to the first embodiment of the present invention.

As illustrated in FIG. 1, if an Invite signal including prioritized-call information is received in step S101, the session control node S/P-CSCF transmits a bearer setup request including the prioritized-call information to the policy and charging control node PCRF in step S102, and the result is that a process for establishing a prioritized-call bearer is triggered between the gateway device P-GW and a mobile station UE in step S103 to S125 illustrated in FIG. 2.

Specifically, in step S103, the policy and charging control node PCRF decides to start a "Dedicated Bearer Activation procedure", and transmits a policy control notification (IP-CAN Session Modification) including the prioritized-call information, to the gateway device P-GW.

If the above-mentioned policy control notification is received, the gateway device P-GW transmits "Create Bearer Request" including the prioritized-call information, to the gateway device S-GW in step S104.

If the above-mentioned "Create Bearer Request" is received, the gateway device S-GW transmits the "Create Bearer Request" including the prioritized-call information to the mobility management node MME in step S105.

If the above-mentioned "Create Bearer Request" is received, the mobility management node MME transmits "Paging" that includes a priority identifier indicating that the prioritized-call information is included in the "Create Bearer Request", to the radio base station eNodeB in step S106.

If the "Paging" is received from the mobility management node MME, the radio base station eNodeB transmits the "Paging" including the priority identifier, to a mobile station UE camping on a subordinate cell in step S107.

In step S108, the mobile station UE transmits "RRC Connection Request" that includes a priority identifier for requesting the setup of a prioritized-call bearer, to the radio base station eNodeB, in response to the "Paging" received from the radio base station eNodeB.

Here, instead of setting the priority identifier in the "Paging" transmitted to the subordinate cell in step S107, the radio base station eNodeB may reduce the total quantity of the "Paging" transmitted to the subordinate cell (for example, may discard "Paging" with no priority identifier at a predetermined ratio), thereby preferentially processing the "Paging (step S107)" corresponding to the "Paging (step S106)", which is received from the mobility management node MME and includes the priority identifier, over another "Paging".

In this way, it is possible for the radio base station eNodeB to uniformly accept the "RRC Connection Request" transmitted by the mobile station UE in response to the "Paging".

In such a case, in step S108, the mobile station UE may not set the priority identifier to the "RRC Connection Request" to be transmitted to the radio base station eNodeB.

In step S109, the radio base station eNodeB transmits "RRC Connection Setup" to the mobile station UE, and in step S110, the mobile station UE transmits "RRC Connection Complete" including "Service Request" to the radio base station eNodeB.

In step S111, the radio base station eNodeB transmits "S1-AP Initial UE Message" including the "Service Request" to the mobility management node MME, and in step S112, the mobility management node MME transmits "S1-AP Initial Context Setup Request" to the radio base station eNodeB.

In step S113, a bearer is set between the radio base station eNodeB and the mobile station UE.

In step S114, the radio base station eNodeB transmits "S1-AP Initial Context Setup Request Complete" to the mobility management node MME, and in step S115, the mobility management node MME transmits "Modify Bearer Request" to the gateway device S-GW.

If the above-mentioned "Modify Bearer Request" is received, the gateway device S-GW transmits "Modify Bearer Response" to the mobility management node MME in step S116.

In step S117, the mobility management node MME transmits "Bearer Setup Request/Session Management Request" to the radio base station eNodeB.

The radio base station eNodeB transmits "RRC Connection Reconfiguration" to the mobile station UE in step S118, the mobile station UE transmits "RRC Connection Reconfiguration Complete" to the radio base station eNodeB in step S119, and the radio base station eNodeB transmits "Bearer Setup Response" to the mobility management node MME in step S120.

In step S121, the mobile station UE transmits "Direct Transfer" to the radio base station eNodeB, and in step S122, the radio base station eNodeB transmits "Session Management Response" to the mobility management node MME.

In step S123, the mobility management node MME transmits "Create Bearer Response" to the gateway device S-GW, and in step S124, the gateway device S-GW transmits "Create Bearer Response" to the gateway device P-GW.

In step S125, the gateway device P-GW transmits a policy control notification Ack (IP-CAN Session Modification) to the policy and charging control node PCRF.

In step S126, the policy and charging control node PCRF transmits a bearer setup completion notification that indicates that the above-mentioned prioritized-call bearer is completely set, to the session control node S/P-CSCF.

If the bearer setup completion notification is received, the session control node S/P-CSCF transmits an Invite signal including prioritized-call information, to the gateway device P-GW in step S127.

Then, the Invite signal is transmitted to the mobile station UE shifted to an active state by the process of setting the prioritized-call bearer of step S103 to step S125.

In accordance with the mobile communication system according to the first embodiment of the present invention, before the Invite signal including the prioritized-call information received in the session control node S/P-CSCF is transferred, the prioritized-call bearer is set between the gateway device P-GW and the mobile station UE, so that the mobile station UE is configured to be shifted to an active state.

That is, since it is possible for the mobility management node MME to detect that the received "Downlink Data Notification" corresponds to a signal related to the prioritized call and it is possible for the radio base station eNodeB to detect that the received "Paging" corresponds to a signal related to the prioritized call, and the received "RRC Connection Request" corresponds to a signal related to the prioritized call, even when the mobility management node MME or the radio base station eNodeB is congested, it is possible to preferentially process the arrival of the prioritized call to the mobile station UE in an idle state over the arrival of the normal call, that is, to allow the mobile station UE to be shifted to an active state and to notify the mobile station UE of the arrival of the prioritized call.

Furthermore, in accordance with the mobile communication system according to the present embodiment, it is possible to preferentially ensure a network and a radio resource according to the prioritized-call bearer.

Mobile Communication System According to Second Embodiment of the Present Invention With reference to FIG. 3 and FIG. 4, a mobile communication system according to a second embodiment of the present invention will be described. Hereinafter, the mobile communication system according to the second embodiment of the present invention will be described while focusing on the difference from the mobile communication system according to the first embodiment as described above.

Figure 3:
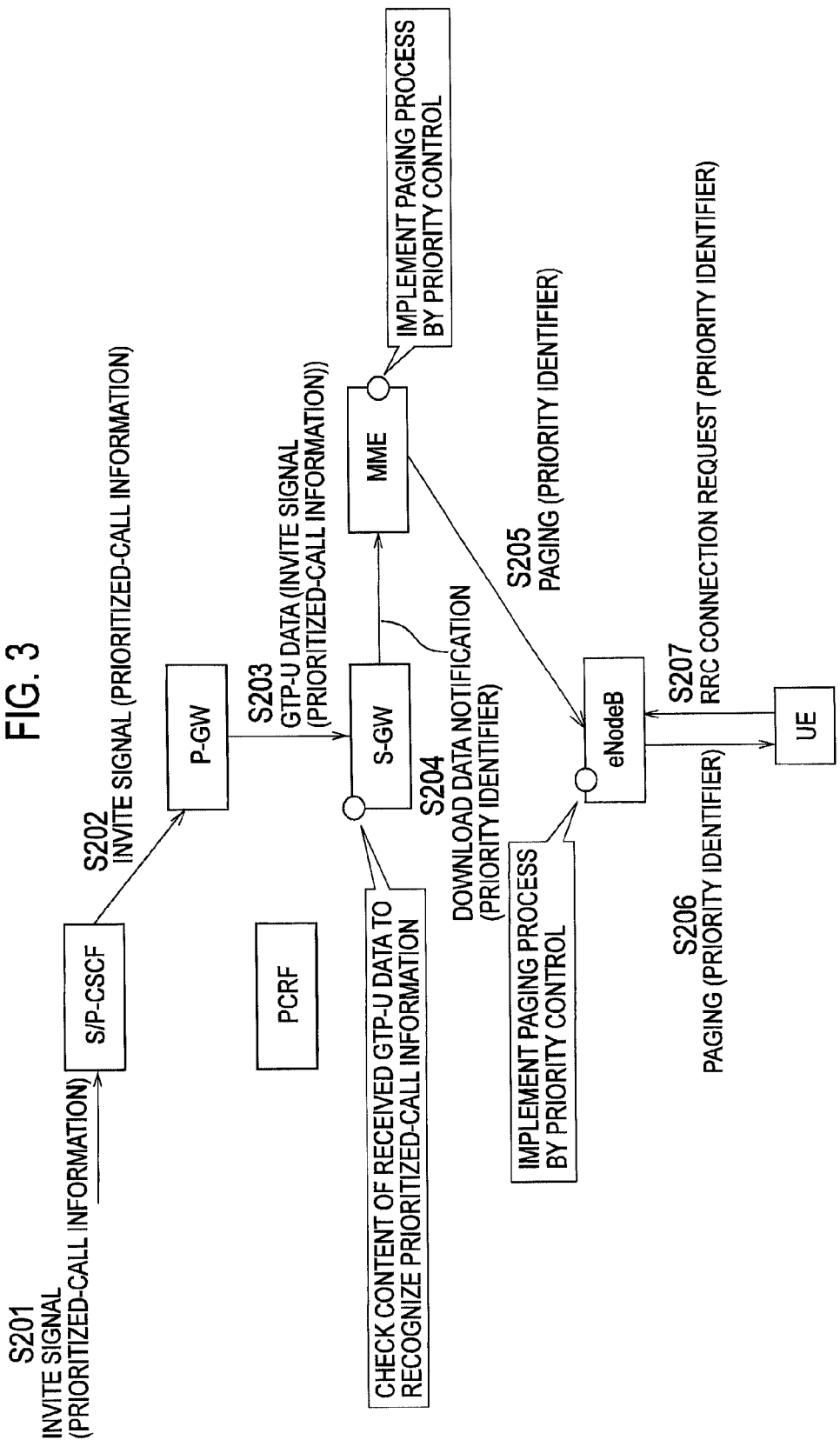
FIG. 3 is a diagram explaining the operation of a mobile communication system according to a second embodiment of the present invention.
Figure 4:
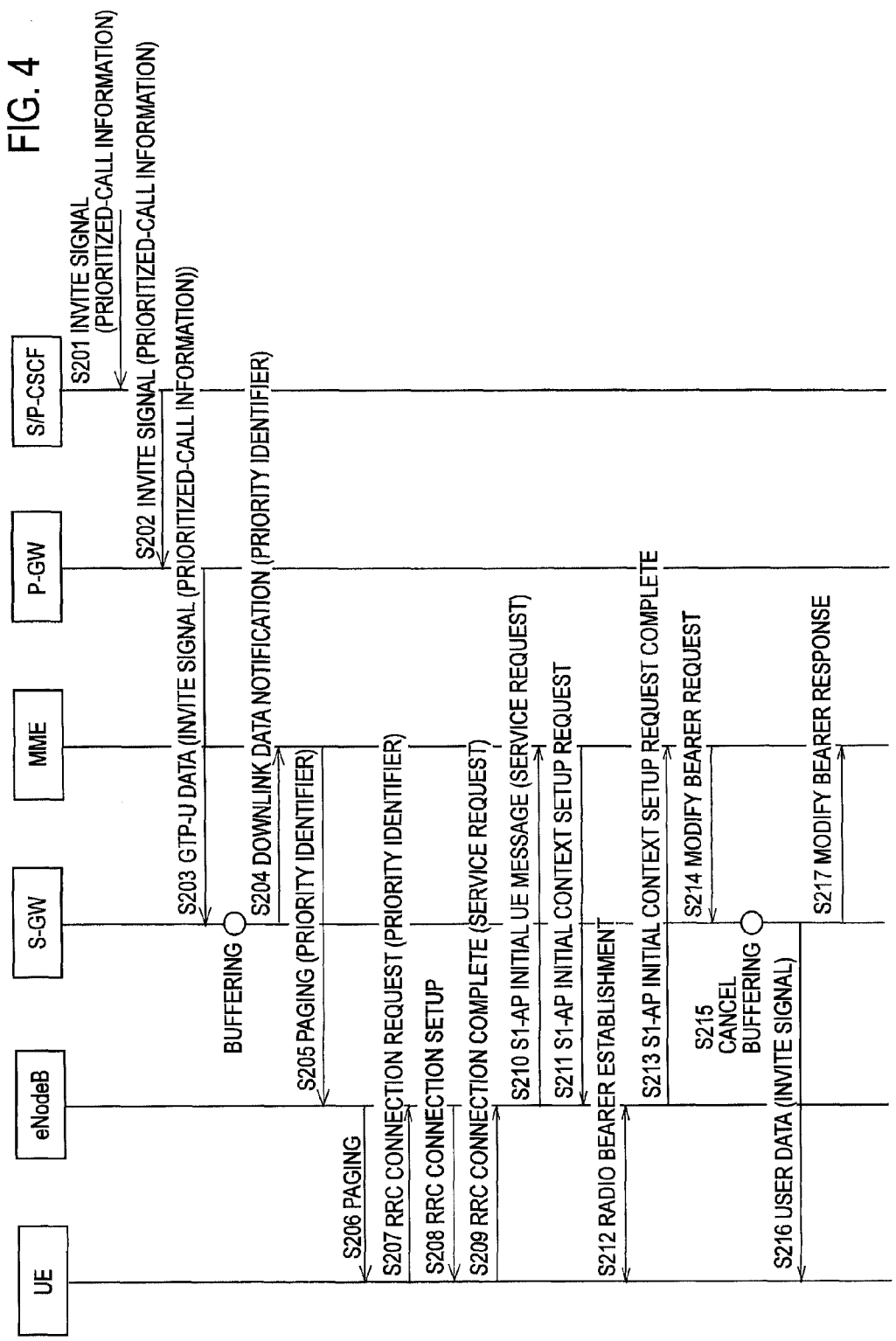
FIG. 4 is a sequence diagram illustrating the operation of the mobile communication system according to the second embodiment of the present invention.

As illustrated in FIG. 3 and FIG. 4, if an Invite signal including prioritized-call information is received in step S201, the session control node S/P-CSCF transfers the Invite signal to the gateway device P-GW in step S202.

In step S203, the gateway device P-GW transmits GTP-U data including the Invite signal to the gateway device S-GW.

In step S204, the gateway device S-GW checks the content of the received GTP-U data, and when the prioritized-call information is included in the GTP-U data, transmits "Downlink Data Notification" that includes a priority identifier indicating to that effect, to the mobility management node MME.

Here, it is assumed that the gateway device S-GW buffers the received GTP-U data.

When the received "Downlink Data Notification" includes the priority identifier, the mobility management node MME transmits "Paging" including the priority identifier to the radio base station eNodeB in step S205.

Here, the mobility management node MME preferentially transmits "Paging" corresponding to the "Downlink Data Notification" including the priority identifier over "Paging" corresponding to "Downlink Data Notification" including no priority identifier.

When the received "Downlink Data Notification" includes the priority identifier, the radio base station eNodeB transmits the "Paging" including the priority identifier to a subordinate cell in step S206.

Here, the radio base station eNodeB preferentially transmits the "Paging" including the priority identifier over "Paging" including no priority identifier.

When the priority identifier is included in the "Paging" received from the radio base station eNodeB, the mobile station UE transmits "RRC Connection Request" including the priority identifier to the radio base station eNodeB in step S207.

Here, instead of setting the priority identifier to the "Paging" transmitted to the subordinate cell in step S206, the radio base station eNodeB may reduce the total quantity of the "Paging" transmitted to the subordinate cell (for example, may discard "Paging" with no priority identifier at a predetermined ratio), thereby preferentially processing the "Paging (step S206)" corresponding to the "Paging (step S205)", which is received from the mobility management node MME and includes the priority identifier, over another "Paging".

In this way, it is possible for the radio base station eNodeB to uniformly accept the "RRC Connection Request" transmitted by the mobile station UE in response to the "Paging".

In such a case, in step S207, the mobile station UE may not set the priority identifier to the "RRC Connection Request" to be transmitted to the radio base station eNodeB.

In step S208, the radio base station eNodeB transmits "RRC Connection Setup" to the mobile station UE, and in step S209, the mobile station UE transmits "RRC Connection Complete" including "Service Request" to the radio base station eNodeB.

In step S210, the radio base station eNodeB transmits "S1-AP Initial UE Message" including the "Service Request" to the mobility management node MME, and in step S211, the mobility management node MME transmits "S1-AP Initial Context Setup Request" to the radio base station eNodeB.

In step S212, a bearer is set between the radio base station eNodeB and the mobile station UE.

In step S213, the radio base station eNodeB transmits "S1-AP Initial Context Setup Request Complete" to the mobility management node MME, and in step S214, the mobility management node MME transmits "Modify Bearer Request" to the gateway device S-GW.

If the above-mentioned "Modify Bearer Request" is received, the gateway device S-GW cancels the buffering of the above-mentioned GTP-U data in step S215, extracts the Invite signal from the GTP-U data to transmit user data including the Invite signal to the mobile station UE in step S216, and transmits "Modify Bearer Response" to the mobility management node MME in step S217.

In accordance with the mobile communication system according to the second embodiment of the present invention, since it is possible for the mobility management node MME to detect that the received "Downlink Data Notification" corresponds to a signal related to the prioritized call and it is possible for the radio base station eNodeB to detect that the received "Paging" corresponds to a signal related to the prioritized call, and the received "RRC Connection Request" corresponds to a signal related to the prioritized call, even when the mobility management node MME or the radio base station eNodeB is congested, it is possible to preferentially process the arrival of the prioritized call to the mobile station UE in an idle state over the arrival of the normal call.

Mobile Communication System According to Third Embodiment of the Present Invention With reference to FIG. 5, a mobile communication system according to a third embodiment of the present invention will be described. Hereinafter, the mobile communication system according to the third embodiment of the present invention will be described while focusing on the difference from the mobile communication system according to the second embodiment as described above.

Figure 5:
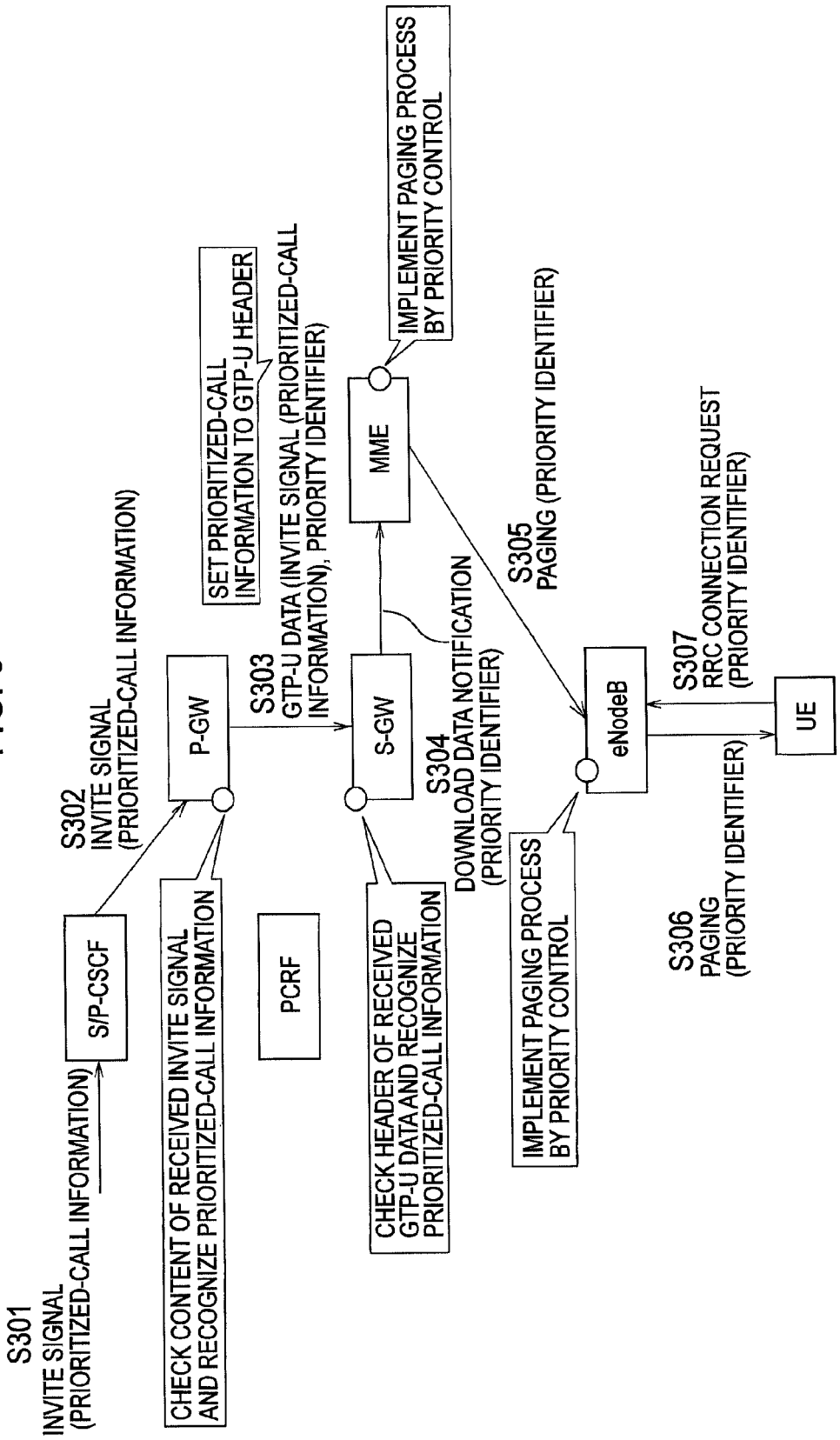
FIG. 5 is a diagram explaining the operation of a mobile communication system according to a third embodiment of the present invention.

As illustrated in FIG. 5, if an Invite signal including prioritized-call information is received in step S301, the session control node S/P-CSCF transfers the Invite signal to the gateway device P-GW in step S302.

In step S303, the gateway device P-GW checks the content of the received Invite signal, and transmits GTP-U data including the Invite signal to the gateway device S-GW when the prioritized-call information is included in the Invite signal.

Here, the gateway device P-GW sets a priority identifier that indicates that the prioritized-call information is included in the Invite signal, to a header portion (a GTP-U header) of the GTP-U data.

When the priority identifier is included in the header portion of the received GTP-U data, the gateway device S-GW transmits "Downlink Data Notification" including the priority identifier to the mobility management node MME in step S304.

Here, it is assumed that the gateway device S-GW buffers the received GTP-U data.

When the received "Downlink Data Notification" includes the priority identifier, the mobility management node MME transmits "Paging" including the priority identifier to the radio base station eNodeB in step S305.

Here, the mobility management node MME preferentially transmits "Paging" corresponding to the "Downlink Data Notification" including the priority identifier over "Paging" corresponding to "Downlink Data Notification" including no priority identifier.

When the received "Downlink Data Notification" includes the priority identifier, the radio base station eNodeB transmits the "Paging" including the priority identifier to a mobile station UE camping on a subordinate cell in step S306.

Here, the radio base station eNodeB preferentially transmits the "Paging" including the priority identifier over "Paging" including no priority identifier.

When the priority identifier is included in the "Paging" received from the radio base station eNodeB, the mobile station UE transmits "RRC Connection Request" including the priority identifier to the radio base station eNodeB in step S307.

Here, instead of setting the priority identifier to the "Paging" transmitted to the subordinate cell in step S306, the radio base station eNodeB may reduce the total quantity of the "Paging" transmitted to the subordinate cell (for example, may discard "Paging" with no priority identifier at a predetermined ratio), thereby preferentially processing the "Paging (step S305)" corresponding to the "Paging (step S306)", which is received from the mobility management node MME and includes the priority identifier, over another "Paging".

In this way, it is possible for the radio base station eNodeB to uniformly accept the "RRC Connection Request" transmitted by the mobile station UE in response to the "Paging".

In such a case, in step S307, the mobile station UE may not set the priority identifier to the "RRC Connection Request" to be transmitted to the radio base station eNodeB.

Subsequent operations are identical to the operations of step S208 to step S217 illustrated in FIG. 4.

In accordance with the mobile communication system according to the third embodiment of the present invention, since it is possible for the mobility management node MME to detect that the received "Downlink Data Notification" corresponds to a signal related to the prioritized call and it is possible for the radio base station eNodeB to detect that the received "Paging" corresponds to a signal related to the prioritized call, and the received "RRC Connection Request" corresponds to a signal related to the prioritized call, even when the mobility management node MME or the radio base station eNodeB is congested, it is possible to preferentially process the arrival of the prioritized call to the mobile station UE in an idle state over the arrival of the normal call.

Mobile Communication System According to Fourth Embodiment of the Present Invention With reference to FIG. 6 and FIG. 7, a mobile communication system according to a fourth embodiment of the present invention will be described. Hereinafter, the mobile communication system according to the fourth embodiment of the present invention will be described while focusing on the difference from the mobile communication system according to the first embodiment as described above.

Figure 6:
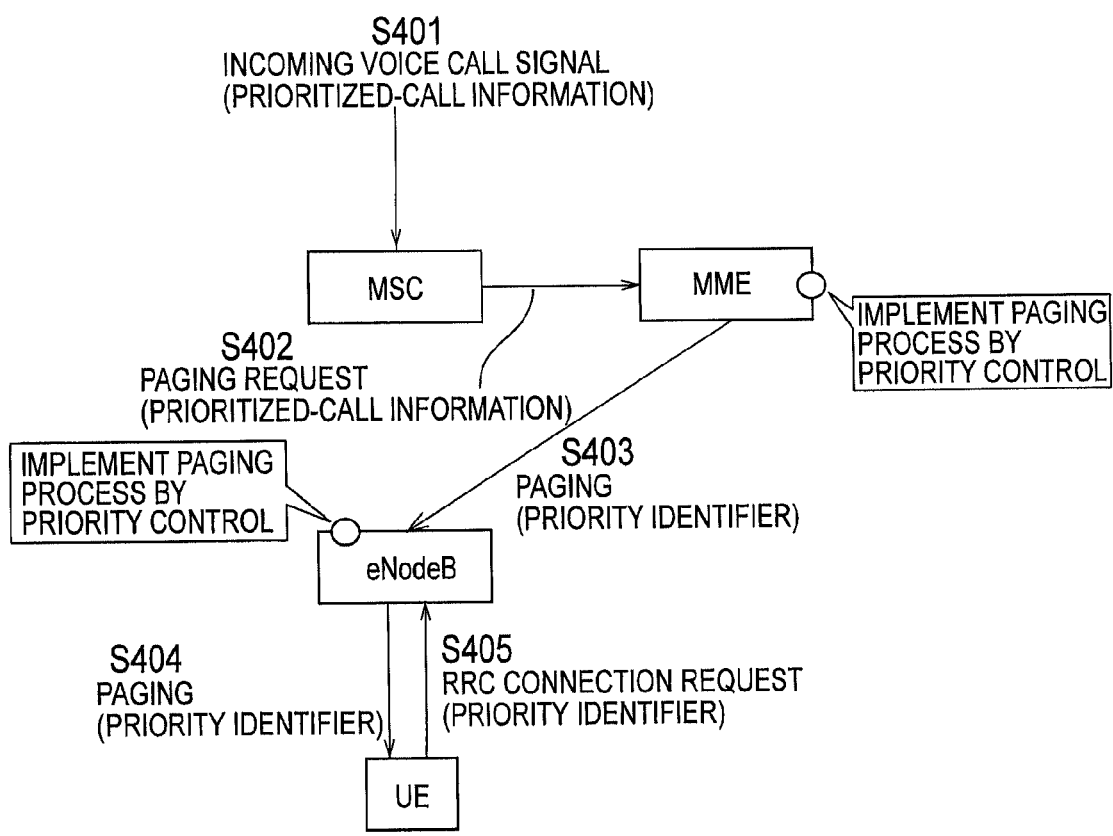
FIG. 6 is a diagram explaining the operation of a mobile communication system according to a fourth embodiment of the present invention.
Figure 7:
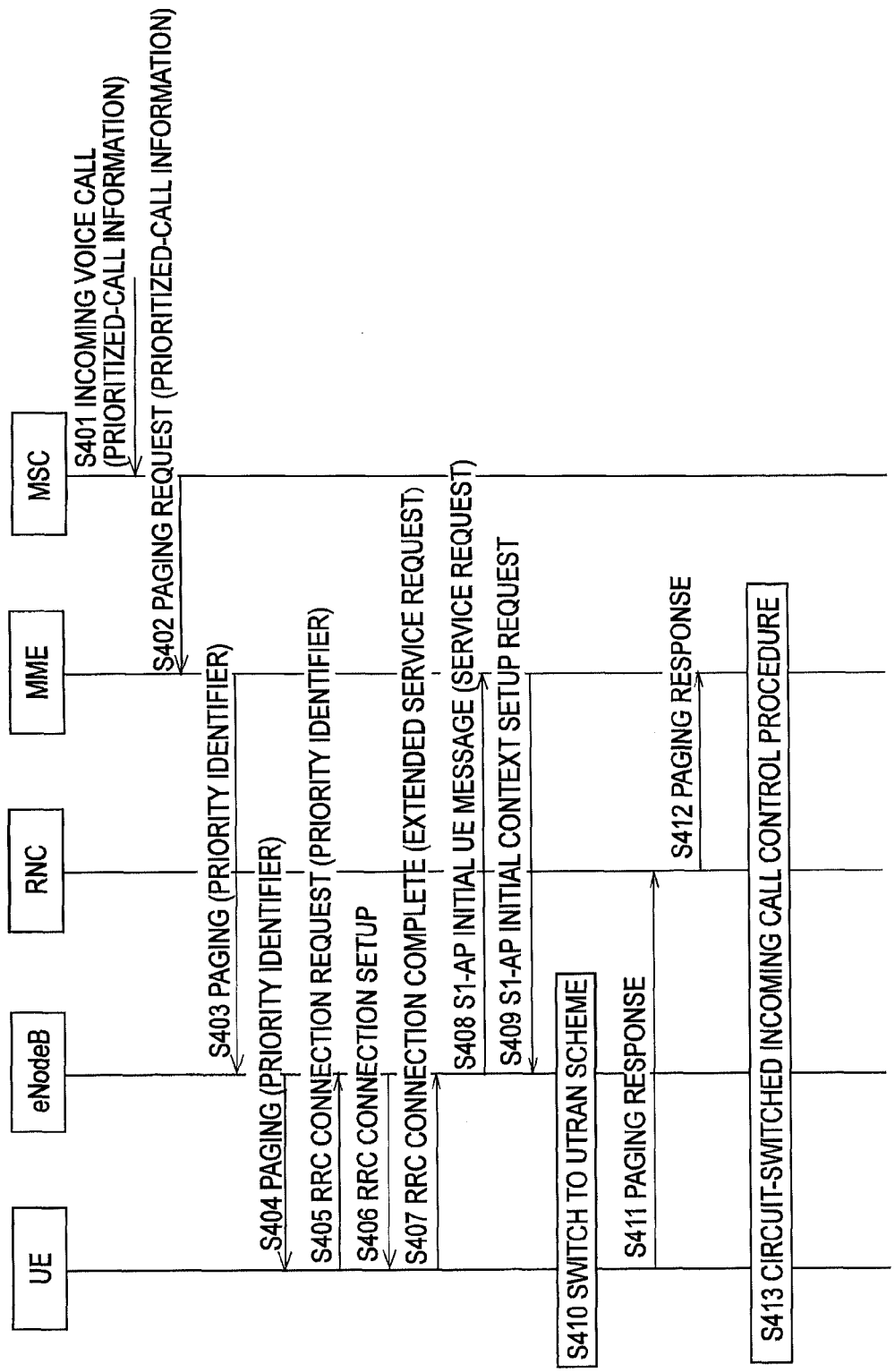
FIG. 7 is a sequence diagram illustrating the operation of a mobile communication system according to the fourth embodiment of the present invention.
Figure 8:
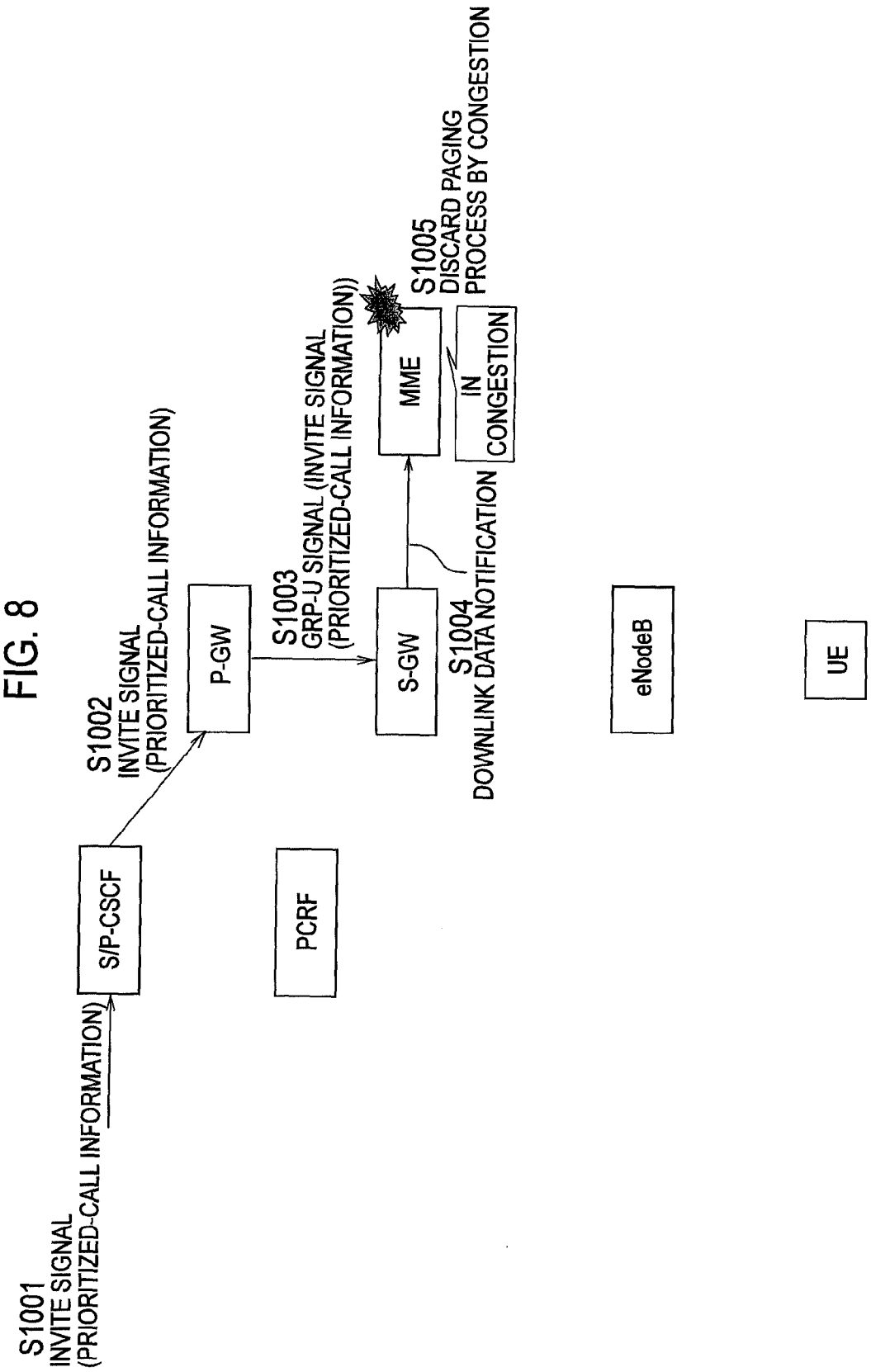
FIG. 8 is a diagram for describing the problems of a conventional mobile communication system.
Figure 9:
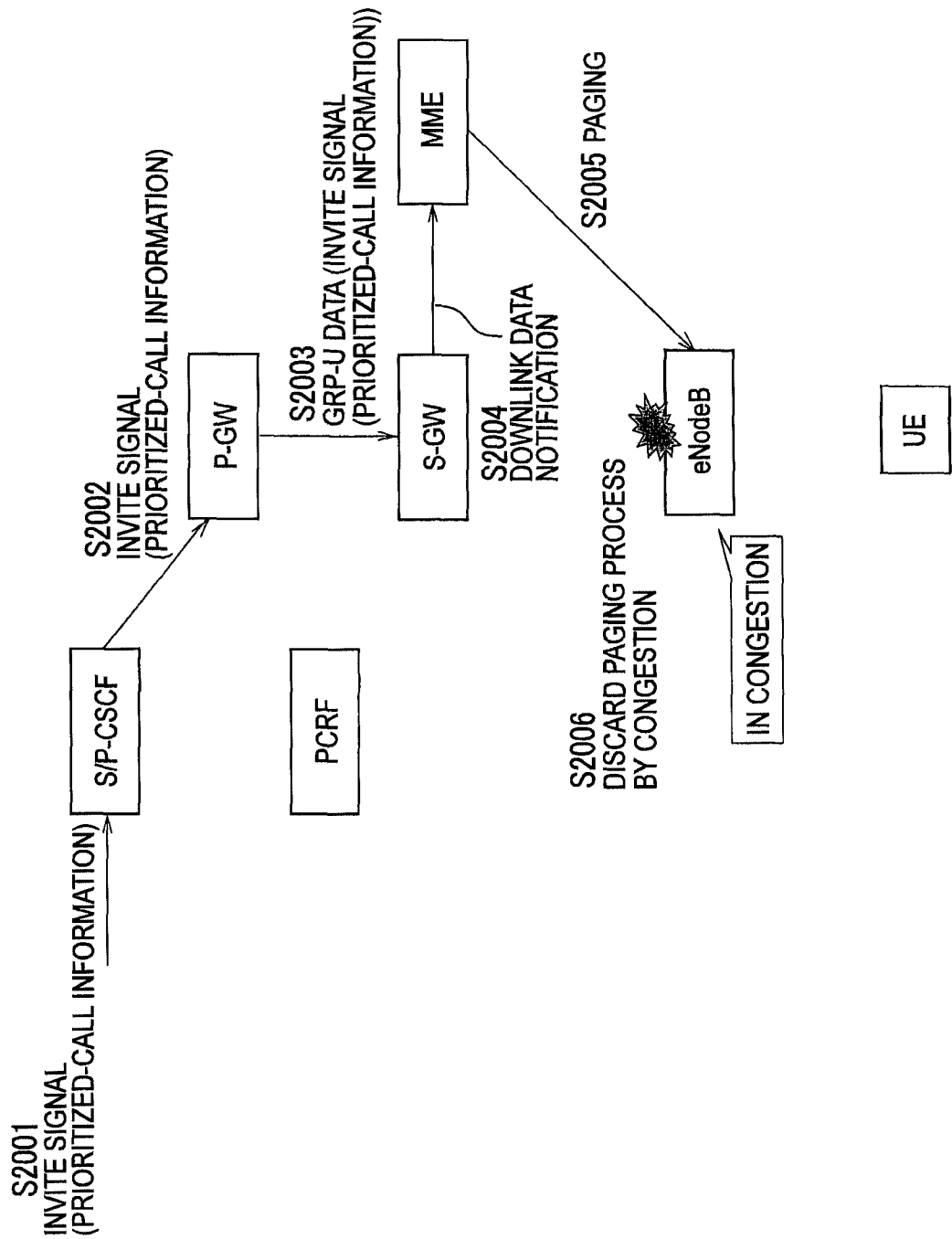
FIG. 9 is a diagram for describing the problems of a conventional mobile communication system.
Figure 10:
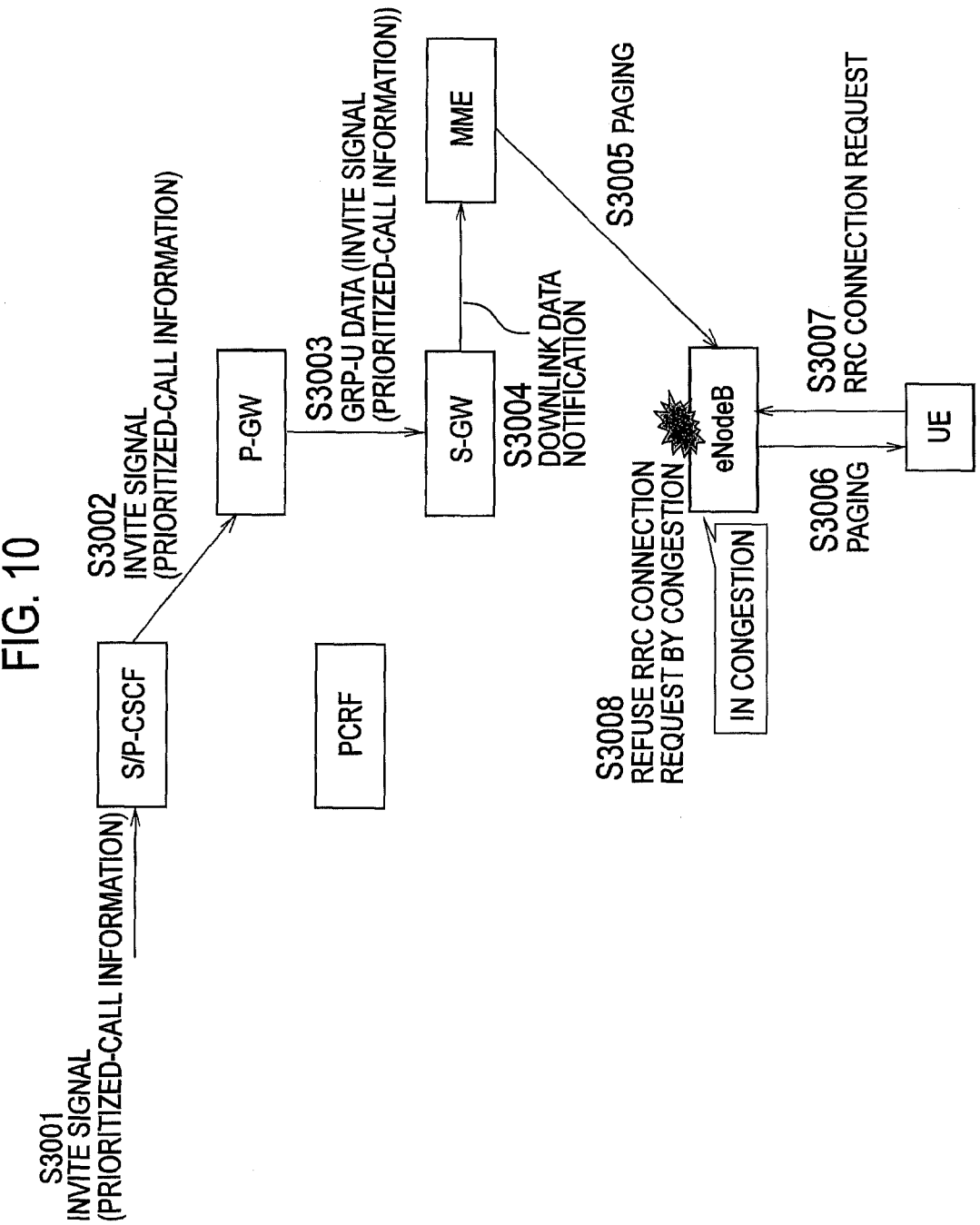
FIG. 10 is a diagram for describing the problems of a conventional mobile communication system.
Figure 11:
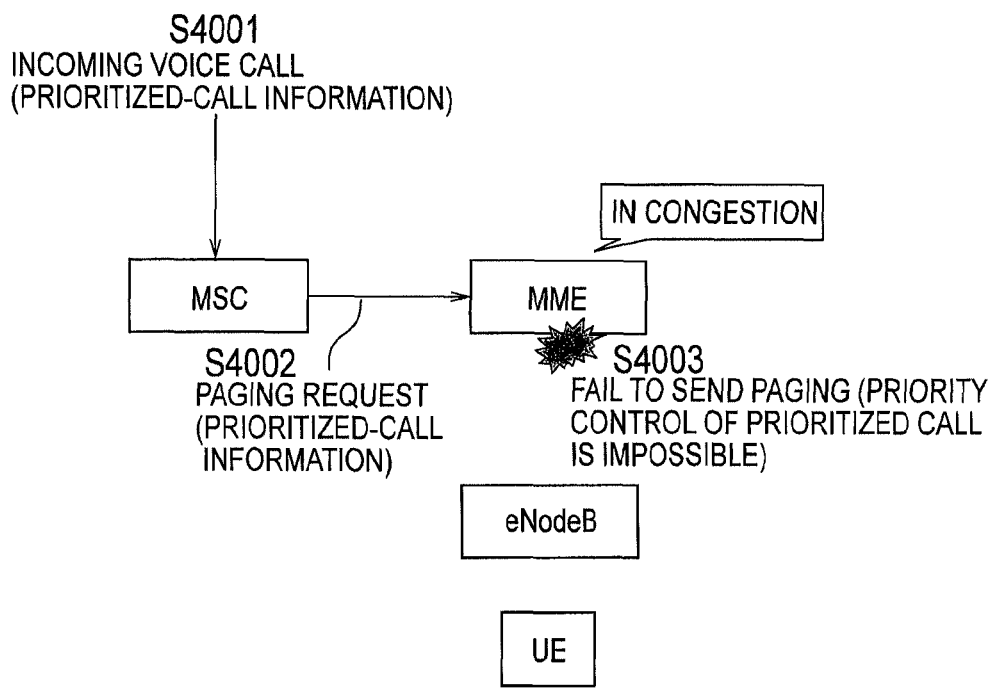
FIG. 11 is a diagram for describing the problems of a conventional mobile communication system.
Figure 12:
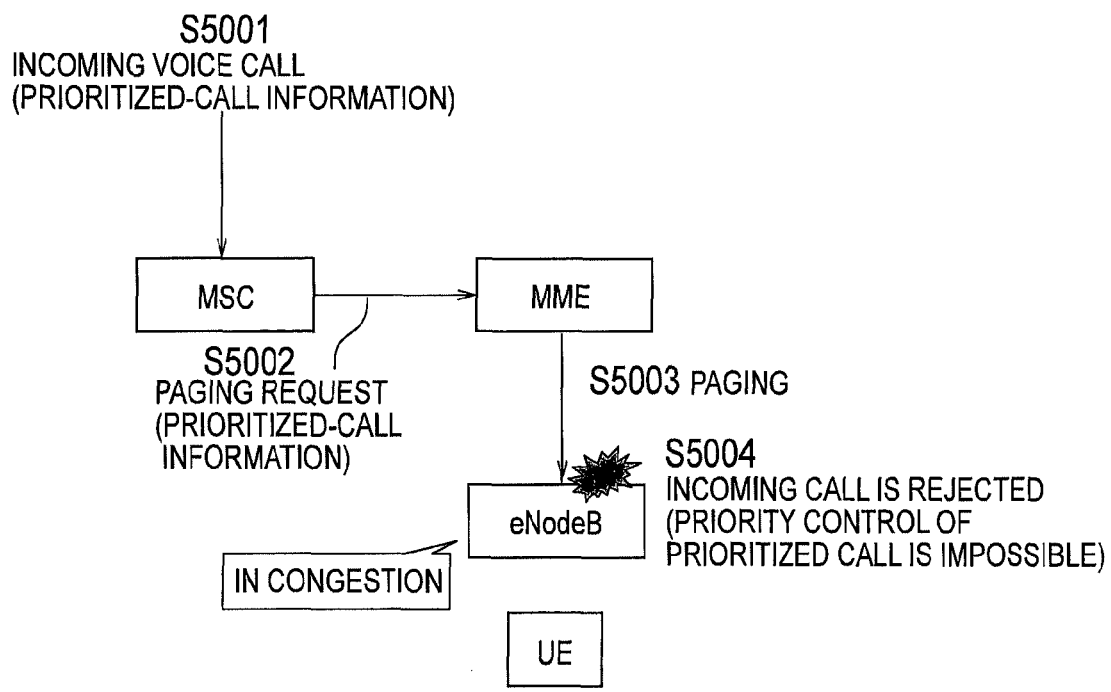
FIG. 12 is a diagram for describing the problems of a conventional mobile communication system.
Figure 13:
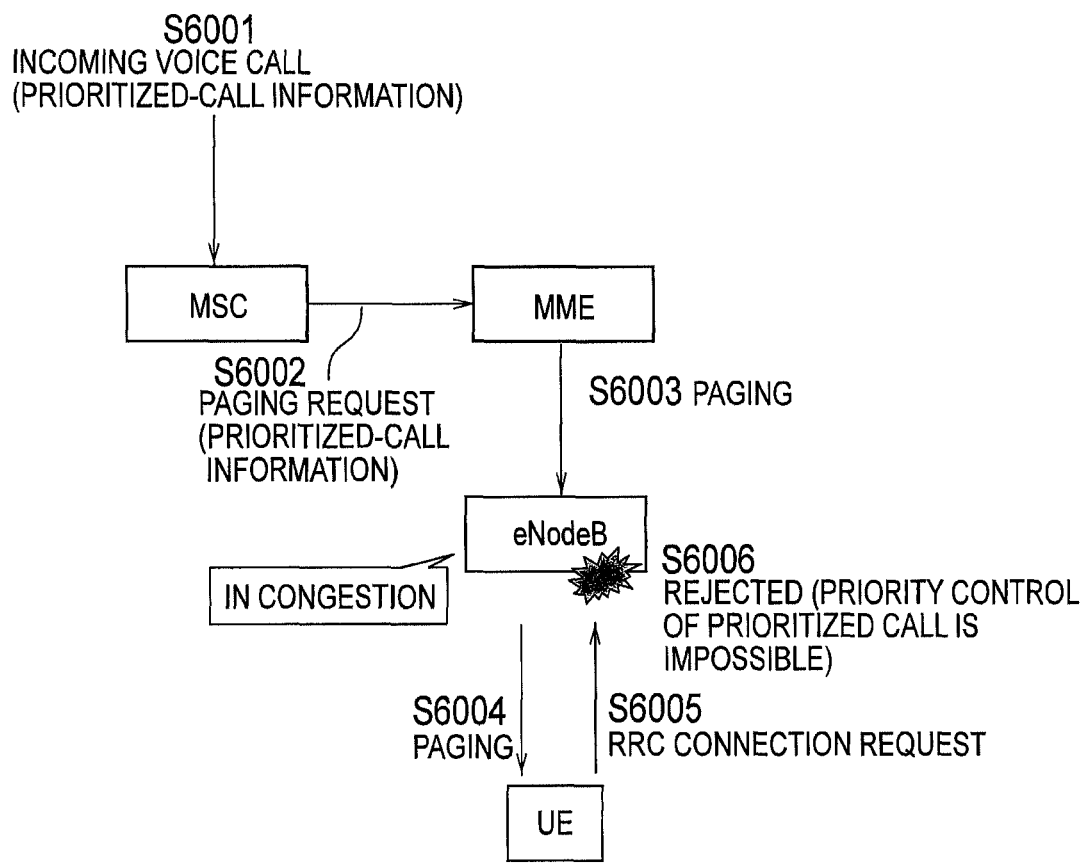
FIG. 13 is a diagram for describing the problems of a conventional mobile communication system.

As illustrated in FIG. 6 and FIG. 7, if an incoming voice call signal including prioritized-call information is received in step S401, the mobile switching center MSC transmits "Paging Request" including the prioritized-call information to the mobility management node MME in step S402.

When the received "Paging Request" includes the priority identifier, the mobility management node MME transmits "Paging" including the priority identifier to the radio base station eNodeB in step S403.

Here, the mobility management node MME preferentially transmits "Paging" corresponding to the "Paging Request" including the priority identifier over "Paging" corresponding to "Paging Request" including no priority identifier.

When the priority identifier is included in the "Paging" received from the mobility management node MME, the radio base station eNodeB transmits the "Paging" including the priority identifier to a mobile station UE camping on a subordinate cell in step S404.

Here, the radio base station eNodeB preferentially transmits the "Paging" including the priority identifier over "Paging" including no priority identifier.

When the priority identifier is included in the "Paging" received from the radio base station eNodeB, the mobile station UE transmits "RRC Connection Request" including the priority identifier to the radio base station eNodeB in step S405.

Here, instead of setting the priority identifier to the "Paging" transmitted to the subordinate cell in step S404, the radio base station eNodeB may reduce the total quantity of the "Paging" transmitted to the subordinate cell (for example, may discard "Paging" with no priority identifier at a predetermined ratio), thereby preferentially processing the "Paging (step S404)" corresponding to the "Paging (step S403)", which is received from the mobility management node MME and includes the priority identifier, over another "Paging".

In this way, it is possible for the radio base station eNodeB to uniformly accept the "RRC Connection Request" transmitted by the mobile station UE in response to the "Paging".

In such a case, in step S405, the mobile station UE may not set the priority identifier to the "RRC Connection Request" to be transmitted to the radio base station eNodeB.

In step S406, the radio base station eNodeB transmits "RRC Connection Setup" to the mobile station UE, and in step S407, the mobile station UE transmits "RRC Connection Complete" including "Extended Service Request" to the radio base station eNodeB.

In step S408, the radio base station eNodeB transmits "S1-AP Initial UE Message" including the "Extended Service Request" to the mobility management node MME, and in step S409, the mobility management node MME transmits "S1-AP Initial Context Setup Request" to the radio base station eNodeB.

In step S410, the mobile station UE switches an E-UTRAN scheme to a UTRAN scheme.

In step S411, the mobile station UE transmits "Paging Response" to radio line control station RNC (Radio Network Controller), and the radio line control station RNC transmits the "Paging Response" to the mobility management node MME.

In step S413, a control procedure for a circuit switched incoming call signal (an incoming voice call signal) is performed between the mobility management node MME and the mobile station UE.

In accordance with the mobile communication system according to the fourth embodiment of the present invention, it is possible for the mobility management node MME to preferentially control a transmission process of the "Paging" based on the prioritized-call information included in the received "Paging Request".

That is, in accordance with the mobile communication system according to the fourth embodiment of the present invention, it is possible for the mobility management node MME in a congestion state to preferentially perform a transmission process of the "Paging" based on the prioritized-call information corresponding to the received "Paging Request" over a transmission process of "Paging" related to a normal call.

In accordance with the mobile communication system according to the fourth embodiment of the present invention, it is possible for the radio base station eNodeB to determine whether the received "Paging" corresponds to a signal related to the prioritized call or corresponds to a signal related to the normal call, so that it is possible for the radio base station eNodeB in a congestion state to preferentially perform a transmission process of the "Paging" related to the prioritized call over a transmission process of "Paging" related to the normal call as described above.

In accordance with the mobile communication system according to the fourth embodiment of the present invention, it is possible for the radio base station eNodeB to determine whether the received "RRC Connection Request" corresponds to a signal related to the prioritized call or corresponds to a signal related to the normal call, so that it is possible for the radio base station eNodeB in a congestion state to preferentially perform a process for the "RRC Connection Request" related to the prioritized call over a process for "RRC Connection Request" related to the normal call as described above.

The characteristics of the present embodiment as described above may be expressed as follows.

A first characteristic of the present embodiment is summarized as a mobile communication method that includes: a step of establishing, by a session control node S/P-CSCF, a prioritized-call bearer between a gateway device P-GW and a mobile station UE when an Invite signal (a session start signal) including prioritized-call information is received; a step of transmitting, by the session control node S/P-CSCF, the Invite signal including the prioritized-call information to the gateway device P-GW after the prioritized-call bearer is established; and a step of transmitting, by the gateway device P-GW, the Invite signal including the prioritized-call information to the mobile station UE.

A second characteristic of the present embodiment is summarized as a mobile communication method that includes: a step of transferring, by a session control node S/P-CSCF, an Invite signal including prioritized-call information to a gateway device P-GW (a first gateway device) when the Invite signal including the prioritized-call information is received; a step of transmitting, by the gateway device P-GW, GTP-U data (user data) including the Invite signal including the prioritized-call information to a gateway device S-GW (a second gateway device); a step of transmitting, by the gateway device S-GW, when the prioritized-call information is included in the Invite signal included in the received GTP-U data, "Downlink Data Notification (a notification signal)" including a priority identifier indicating the inclusion, to a mobility management node MME; a step of transmitting, by the mobility management node MME, "Paging (a paging signal)" including the priority identifier to a radio base station eNodeB; a step of transmitting, by the radio base station eNodeB, the "Paging (the paging signal)" including the priority identifier to a mobile station UE; and a step of transmitting, by the mobile station UE, "RRC Connection Request (a connection setup request signal)" including the priority identifier to the radio base station eNodeB in response to the "Paging" received from the radio base station eNodeB.

A third characteristic of the present embodiment is summarized as a mobile communication method that includes: a step of transferring, by a session control node S/P-CSCF, an Invite signal including prioritized-call information to a gateway device P-GW when the Invite signal including the prioritized-call information is received; a step of transmitting, by the gateway device P-GW, when the prioritized-call information is included in the received Invite signal, GTP-U data including a priority identifier indicating the inclusion and the Invite signal, to a gateway device S-GW; a step of transmitting, by the gateway device S-GW, "Downlink Data Notification" including the priority identifier to a mobility management node MME; a step of transmitting, by the mobility management node MME, "Paging" including the priority identifier to a radio base station eNodeB; a step of transmitting, by the radio base station eNodeB, the "Paging" including the priority identifier to a mobile station UE; and a step of transmitting, by the mobile station UE, "RRC Connection Request" including the priority identifier to the radio base station eNodeB in response to the "Paging" received from the radio base station eNodeB.

A fourth characteristic of the present embodiment is summarized as a mobile communication method that includes: a step of transmitting, by a mobile switching center MSC (a core network device of a first communication scheme), "Paging Request (a paging request signal)" including prioritized-call information to a mobility management node MME (a core network device of a second communication scheme) when an incoming call signal (for example, an incoming voice call signal) including the prioritized-call information is received; a step of transmitting, by the mobility management node MME, when the prioritized-call information is included in the received "Paging Request", "Paging" including a priority identifier indicating the inclusion, to a radio base station eNodeB; a step of transmitting, by the radio base station eNodeB, the "Paging" including the priority identifier to a mobile station UE; and a step of transmitting, by the mobile station UE, "RRC Connection Request" including the priority identifier to the radio base station eNodeB in response to the "Paging" received from the radio base station eNodeB.

A fifth characteristic of the present embodiment is summarized in that a session control node S/P-CSCF is configured to instruct a policy and charging control node PCRF to establish a prioritized-call bearer between a gateway device P-GW and a mobile station UE when an Invite signal including prioritized-call information is received, and to transmit the Invite signal including the prioritized-call information to the gateway device P-GW after the prioritized-call bearer is established.

A sixth characteristic of the present embodiment is summarized in that a gateway device S-GW connected to a gateway device P-GW and a mobility management node MME is configured to transmit, when prioritized-call information is included in an Invite signal included in GTP-U data received from the gateway device P-GW, "Downlink Data Notification" including a priority identifier indicating the inclusion, to the mobility management node MME.

In addition, in the sixth characteristic of the present embodiment, when the Invite signal received from the gateway device P-GW is encrypted, the gateway device S-GW may be configured to set a priority identifier to an unencrypted header portion of the "Downlink Data Notification".

A seventh characteristic of the present embodiment is summarized in that a gateway device P-GW connected to a session control node S/P-CSCF and a gateway device S-GW is configured to transmit, when prioritized-call information is included in the Invite signal received from the session control node S/P-CSCF, GTP-U data including a priority identifier indicating the inclusion and an Invite signal, to the gateway device S-GW.

In addition, in the seventh characteristic of the present embodiment, when the Invite signal received from the session control node S/P-CSCF is encrypted, the gateway device P-GW may be configured to set a priority identifier to an unencrypted header portion of the Invite signal.

An eighth characteristic of the present embodiment is summarized in that a mobility management node is configured to preferentially transmit, when prioritized-call information is included in "Paging Request" received from a mobile switching center MSC (a core network device of another communication scheme), "Paging" including a priority identifier indicating the inclusion, to a subordinate radio base station eNodeB over "Paging" including no priority identifier the priority identifier.

In addition, the operation of the above-mentioned the radio base station eNodeB, the mobility management node MME, the session control node S/P-CSCF, the charging control node PCRF, the gateway device P-GW or the gateway device S-GW may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

Such a storage medium is connected to the processor so that the processor can write and read information into and from the storage medium. Such a storage medium may also be accumulated in the processor. Such storage medium and processor may be arranged in an ASIC. Such ASIC may be arranged in the radio base station eNodeB, the mobility management node MME, the session control node S/P-CSCF, the charging control node PCRF, the gateway device P-GW or the gateway device S-GW. As a discrete component, such storage medium and processor may be arranged in the radio base station eNodeB, the mobility management node MME, the session control node S/P-CSCF, the charging control node PCRF, the gateway device P-GW or the gateway device S-GW.

Thus, the present invention has been specifically explained by using the above-mentioned embodiments; however, it is obvious that for persons skilled in the art, the present invention is not limited to the embodiments explained herein. The present invention can be implemented as corrected and modified modes without departing from the gist and the scope of the present invention defined by the claims. Therefore, the description of the specification is intended for explaining the example only and does not impose any limited meaning to the present invention.

The invention claimed is:

1. A mobile communication method which performs a process for an incoming call destined to a mobile station that is in a state of having a session control bearer relating to a prioritized call set between a serving gateway device of the mobile station and a packet data network gateway device, the method comprising:
   a step A of checking, by the serving gateway device, a header of GPRS Tunneling Protocol-U plane (GTP-U) data received from the packet data network gateway device and notifying a mobility management node of a downlink data notification including a priority identifier indicating whether or not a signal is related to the prioritized call based on reception of the GTP-U data;
   a step B of transmitting, by the mobility management node, a paging signal to a radio base station, in response to the downlink data notification received from the serving gateway device;
   a step C of transmitting, by the radio base station, a paging signal to the mobile station, in response to the paging signal received from the mobility management node; and
   a step D of transmitting, by the mobile station, a connection setup request signal to the radio base station, in response to the paging signal received from the radio base station, wherein in the step B, the mobility management node performs priority control for the transmission of the paging signal, based on the priority identifier included in the received downlink data notification, and wherein in the step B, the mobility management node transmits the paging signal including the priority identifier to the radio base station, and in the step C, the radio base station preferentially processes the paging signal caused by arrival of a prioritized call to the mobile station in idle state over the paging signal caused by arrival of a normal call, based on the priority identifier included in the received paging signal.

2. A mobility management node, wherein the mobility management node is configured to:

in a process for an incoming call destined to a mobile station that is in a state of having a session control bearer relating to a prioritized call set between a serving gateway device of the mobile station and a packet data network gateway device, receive a downlink data notification from the serving gateway device, wherein the serving gateway device checks a header of GPRS Tunneling Protocol-U plane (GTP-U) data received from the packet data network gateway device;

perform priority control for a transmission of a paging signal to a radio base station based on a priority identifier indicating whether or not a signal is related to the prioritized call based on reception of the GTP-U data included in the received downlink data notification, wherein the mobility management node transmits the paging signal including the priority identifier to the radio base station; and determine whether to transmit the paging signal including the priority identifier, to the radio base station, in response to the received downlink data notification, wherein the radio base station preferentially processes the paging signal caused by arrival of a prioritized call to the mobile station in idle state over the paging signal caused by arrival of a normal call, based on the priority identifier included in the received paging signal.

\* \* \* \* \*